United States Patent
Kelly

(10) Patent No.: US 6,796,564 B2
(45) Date of Patent: Sep. 28, 2004

(54) TABLE DOLLY

(76) Inventor: Russell J. Kelly, 1015 Andarella Way, Vero Beach, FL (US) 32963-2379

( * ) Notice: Subject to any disclaimer, the term of this patent is extended or adjusted under 35 U.S.C. 154(b) by 47 days.

(21) Appl. No.: 10/137,302

(22) Filed: May 3, 2002

(65) Prior Publication Data

US 2003/0205874 A1 Nov. 6, 2003

(51) Int. Cl.$^7$ ................................................. B62B 1/00
(52) U.S. Cl. ............................... 280/47.24; 280/47.34; 280/79.6
(58) Field of Search ........................... 280/47.24, 47.27, 280/47.28, 47.23, 47.131, 47.17, 47.34, 47.35, 43.12, 47.331, 79.11, 79.4, 79.6, 79.7, 649, 651, 43.34, 43.1, 43.24, 47.33, 47.29; 414/444, 490

(56) References Cited

U.S. PATENT DOCUMENTS

| | | | | |
|---|---|---|---|---|
| 454,448 | A | * 6/1891 | Barley ........................ 248/129 |
| 701,582 | A | * 6/1902 | Layng ......................... 280/62 |
| 1,358,235 | A | 11/1920 | Nylin |
| D143,329 | S | * 12/1945 | Leonard ...................... D34/24 |
| 2,514,308 | A | * 7/1950 | Burg .......................... 280/79.3 |
| 2,621,815 | A | * 12/1952 | Gannon ....................... 414/537 |
| 2,681,740 | A | * 6/1954 | Schueler ...................... 414/444 |
| 2,800,235 | A | * 7/1957 | Reich ......................... 414/490 |
| 3,132,875 | A | 5/1964 | Plumly |
| 3,717,357 | A | * 2/1973 | Schaefer ...................... 280/35 |
| 3,930,663 | A | * 1/1976 | Scripter ....................... 280/654 |
| 3,994,461 | A | * 11/1976 | Dorantes ................. 248/188.7 |
| 4,138,132 | A | * 2/1979 | Doyle ........................ 280/304.3 |
| 4,439,085 | A | * 3/1984 | Rodriguez et al. .......... 414/447 |
| 4,505,489 | A | * 3/1985 | Specie .................... 280/47.131 |
| 4,566,708 | A | 1/1986 | Specie |
| 4,602,802 | A | * 7/1986 | Morgan ................. 280/47.331 |
| 4,635,951 | A | 1/1987 | Berfield et al. |
| 4,639,005 | A | * 1/1987 | Birkley ..................... 280/43.14 |
| 4,688,761 | A | * 8/1987 | Wilcox ....................... 254/104 |
| 4,822,065 | A | * 4/1989 | Enders ................... 280/47.331 |
| 4,867,465 | A | * 9/1989 | Dunchock .................. 280/79.3 |
| 5,037,117 | A | 8/1991 | Hershberger |
| 5,092,615 | A | 3/1992 | Gregalis |
| 5,123,797 | A | * 6/1992 | Schnelle et al. ............. 414/401 |
| 5,125,626 | A | * 6/1992 | Lonsway et al. ........... 254/8 R |
| 5,356,197 | A | 10/1994 | Simic |
| 5,405,236 | A | * 4/1995 | Sundstrom et al. ......... 414/495 |
| 5,788,251 | A | * 8/1998 | Johnson ................... 280/43.17 |
| 5,871,219 | A | * 2/1999 | Elliott ........................ 280/79.3 |
| 5,887,460 | A | * 3/1999 | Williams ....................... 70/18 |
| D408,111 | S | * 4/1999 | Cook .......................... D34/24 |
| 5,915,911 | A | * 6/1999 | Hodgetts ..................... 414/527 |
| 6,053,515 | A | 4/2000 | Kelley |
| 6,099,001 | A | * 8/2000 | Barresi ....................... 280/79.6 |
| 6,168,174 | B1 | 1/2001 | MacDougall |
| 6,186,728 | B1 | 2/2001 | Michaud |
| 6,217,045 | B1 | * 4/2001 | Leyton ...................... 280/79.7 |
| 6,250,655 | B1 | * 6/2001 | Sheeks ...................... 280/79.7 |
| 6,296,262 | B1 | * 10/2001 | Skinner ..................... 280/79.7 |
| 6,299,195 | B1 | 10/2001 | Chan |
| D456,582 | S | * 4/2002 | Riach .......................... D34/24 |
| 6,454,282 | B2 | * 9/2002 | Sexton et al. .............. 280/79.7 |
| 6,474,930 | B1 | * 11/2002 | Simpson ..................... 414/490 |
| 6,484,649 | B1 | * 11/2002 | Wang ......................... 108/158 |
| 6,637,761 | B1 | * 10/2003 | Boettcher ................ 280/47.24 |

* cited by examiner

*Primary Examiner*—Bryan Fischmann
*Assistant Examiner*—Christopher D Bottorff
(74) *Attorney, Agent, or Firm*—Griffin & Szipl, P.C.

(57) ABSTRACT

A table dolly apparatus for carrying a pedestal table (i.e. a table having a table top with an undersurface, a central pillar connected the table top and a base connected to the pillar) is disclosed wherein the dolly apparatus includes a frame having a handle portion; at least one wheel member rotatingly connected to the frame; two brackets disposed on the frame, wherein each bracket provides a fulcrum member for engaging an undersurface of a pedestal table; and a support member disposed on a front end of the frame, so that when an undersurface of a pedestal table engages each fulcrum member, the base of the pedestal table engages the support member so that the dolly apparatus carries the pedestal table. A method for moving pedestal tables is also described.

18 Claims, 6 Drawing Sheets

TABLE DOLLY

FIELD OF THE INVENTION

The present invention relates to a table dolly for conveniently and rapidly moving tables. More particularly, the invention relates to a table dolly for moving pedestal tables, wherein the dolly has one or more cradle hooks or claws constructed to provide a fulcrum upon which an underside of a pedestal-type table can be balanced and a support member disposed on the front end of the table dolly frame so as to provide a surface upon which the base of the pedestal-type table rests, thereby stabilizing the table on the table dolly for transport.

BACKGROUND OF THE INVENTION

In restaurant businesses, catering businesses, and the like, it is often necessary to move tables about in a room or catering area when preparing for various events such as parties, weddings, dances, conferences, etc. To save on time and effort, there is a need for devices for moving tables conveniently and rapidly using as little labor as possible. Thus, the mechanical art of table dolly construction has evolved. Specifically, many table dolly devices have been constructed to move and/or store portable, foldable tables. Several examples of prior art devices for moving and/or storing foldable tables are disclosed in U.S. Pat. No. 6,296,262 to Skinner, U.S. Pat. No. 6,250,655 to Sheeks, U.S. Pat. No. 6,217,045 to Leyton, and U.S. Pat. No. 5,871,219 to Elliott. Other table dolly devices have been constructed to move other types of tables. For example, U.S. Pat. No. 5,405,236 to Sundstromn et al. and U.S. Pat. No. 5,125,626 to Lonsway et al. disclose devices for moving pool tables. U.S. Pat. No. 4,639,005 to Birkley discloses a carriage apparatus for moving saw tables, and U.S. Pat. No. 4,566,708 and U.S. Patent Des 408,111 are directed to picnic table dollies.

However, there is not much taught in the prior art regarding a table dolly for moving a pedestal table (i.e., a table having a pedestal base rather than a plurality of legs extending directly from the table top). The most relevant prior art device is a table dolly marketed as "Kelly's Table Taxi," previously conceived, manufactured and sold by the present inventor, which is illustrated in FIGS. 1 and 2. Specifically, the prior art table dolly 1 is constructed to have a frame 5 preferably made of a lightweight metal, such as aluminum alloy tubing, to which a wheel axle 10 connects so that wheels 14 can be mounted to the frame to permit wheeled motion of the dolly. The frame 5 includes a stand portion 18 so that the two wheels 14 and the stand portion form a tripod for supporting the table dolly 1 on a flat surface or floor. Stand portion 18 can also be used as a lever for rotating the frame 5 about the wheel axis 10 as will be described below. Two brackets 20, being cradle hooks or claws, are disposed and positioned on the frame 5 so as to provide a cradle for holding a pedestal table T as shown in FIG. 2.

Each bracket 20 has a roughly J-shaped portion 22, having a long forwardly pointing finger and a short rearwardly pointing finger, and has a base portion 24 located at the base of the "J" of portion 22, wherein the base portion is integrally welded to frame 5. Some models used two bolts to bolt the base portion to the frame 5. A rubberized pad 26 is provided on an inner surface of the J of portion 22 of each roughly J-shaped bracket 20, wherein pad 26 provides a contiguous cushioned pad along the inner surface of portion 22. Pad 26 is attached to portion 22 by means of an adhesive and two bolts. Models having a scratch preventing plastisol covering formed to cover the outer surface of both fingers and a part of the base portion 24 have been manufactured and sold to provide an improvement over the prior art dolly 1. Specifically, by replacing pads 26 with a contiguous scratch resistant covering over most of each bracket 20, the risk of accidentally gouging or scratching table T is markedly reduced.

To maneuver the table dolly 1, frame 5 has a handle portion 30 that is grabbed by one using the dolly so the dolly can be pushed or pulled on a flat surface or floor. FIG. 2 shows the dolly 1 holding a pedestal table T in the cradle provided by brackets 20. Pedestal table T has a base B that can be a single round or conical unitary structure, or base B can be provided by a structure having three or more radially directed roughly linear legs or feet. Base B is attached to a central pillar P, which is attached to an undersurface U of the table top. Base B and pillar P form a pedestal upon which the undersurface U of the table top rests, which is the distinguishing feature of a pedestal-type table. As is plain from FIG. 2, one using the dolly 1 can push or pull on handle portion 30 to move the dolly, and the pedestal table T is carried by the dolly as the dolly moves along a flat surface or floor by means of the wheels 14.

However, the prior art table dolly 1 for moving pedestal tables has several disadvantages. First, there is only one reasonable way to carry and move a pedestal table using table dolly 1, which is to position the pillar P of table T in brackets 20. Therefore, it is necessary to tilt the table T or place table T on its side in order to maneuver the dolly 1 so as to position pillar P into the cradle provided by brackets 20. Frame 5 is rotated forwardly about wheel axis 10 until the brackets 20 are positioned so that pillar P rests in the cradle provided by brackets 20. Then the dolly 1 can be used to pick up the table T by having the user step on stand portion 18 if necessary to provide leverage to rearwardly rotate the dolly and table into the position shown in FIG. 2. Attempts to use dolly 1 in another manner, such as by balancing the table T by placing the undersurface U of the table top on the fingers of the brackets 20, has been unsuccessful because the tips of the fingers are not covered by the pads 26 so the brackets gouge into the undersurface U. In addition, the base B of table T either abuts against the wheels 14 providing a brake, thereby making it impossible to move the dolly 1, or the base B merely swings down and hits the floor. In other words, it is impractical to balance a table T on the dolly 1 except by placing the pillar P in the brackets 20 as shown in FIG. 2.

Another disadvantage of the prior art pedestal table dolly 1 is that the brackets 20 are welded to the frame 5. This creates a packaging problem when shipping the device to customers. Detachable brackets would obviate this problem.

Another disadvantage of the prior art pedestal table dolly is that the pads 26 are glued and bolted in place, which increases manufacturing costs and creates the problem that the pads sometimes come loose. In addition, the pads 26 do not cover the tips of the fingers of the roughly J-shaped portion 22, which predisposes the exposed metal tips to gouging or scratching the tables T.

The present invention endeavors to provide an improved table dolly for moving pedestal tables so that the dolly in accordance with the present invention maintains the advantages of the prior art pedestal table dolly while overcoming the disadvantages of the prior art devices.

Accordingly, a primary object of the present invention is to provide a table dolly for moving a pedestal table that overcomes the disadvantages of the prior art devices.

Another object of the present invention is to provide a table dolly for moving a pedestal table that conveniently and rapidly carries a pedestal table by engaging an undersurface of the pedestal table and by engaging the base of the pedestal table.

Another object of the present invention is to provide a table dolly for moving a pedestal table wherein the brackets forming the cradle are detachable so as to facilitate packaging for shipping.

Another object of the present invention is to provide a table dolly for moving a pedestal table that is simple and inexpensive to manufacture.

Another object of the present invention is to provide a table dolly for moving a pedestal table that has a fully cushioned fulcrum member so as to avoid scratching or gouging of a pedestal table.

SUMMARY OF THE INVENTION

In accordance with the above objectives, a first preferred embodiment of the present invention provides a table dolly apparatus for carrying a pedestal table wherein the table includes a table top having an undersurface, a central pillar connected to the table top at one end and having a base at another, the dolly apparatus comprising: a frame having a handle portion; at least one wheel member rotatingly connected to the frame; two brackets disposed on the frame, wherein each bracket provides a fulcrum member for engaging an undersurface of a pedestal table; and a support member disposed on a front end of the frame, so that when each fulcrum member engages an undersurface of a pedestal table, the base of the pedestal table is supported by the support member so that the dolly apparatus carries the pedestal table.

In a second preferred embodiment of the present invention, the first preferred embodiment is modified so that each bracket is detachably connected to the frame.

In a third preferred embodiment of the present invention, each bracket of the first embodiment is formed to have a shape selected from the group consisting of a J-shape, a U-shape, a V-shape, a C-shape, and a ✓-shape, or an approximation of one of these shapes.

In a fourth preferred embodiment of the present invention, each fulcrum member of the first embodiment has an outer surface completely covered by scratch preventing material.

In a fifth preferred embodiment of the present invention, the frame in accordance with the first embodiment includes a stand portion.

In a sixth preferred embodiment of the present invention, the support member in accordance with the first embodiment has a first outer surface portion demarcated from a second outer surface portion by a bend in the support member.

In a seventh preferred embodiment of the present invention, said at least one wheel member comprises a pair of wheel members rotatingly connected to an axle connected to the frame, and wherein said support member comprises a plate disposed in front of the axle and between the two wheel members.

In an eighth preferred embodiment of the present invention, A method for moving pedestal tables comprising the steps of: (a) providing a pedestal table having a table top, a pillar having one end connected connected to the table top and having a base at another end; and (b) providing a dolly apparatus comprising (i) a frame having a handle portion, ii. at least one wheel member rotatingly connected to the frame, (iii) two brackets disposed on the frame, wherein each bracket provides a fulcrum member for engaging an undersurface of a pedestal table, and (iv) a support member disposed on a front end of the frame, so that when each fulcrum member engages an undersurface of a pedestal table, the base of the pedestal table is supported by the support member so that the dolly apparatus carries the pedestal table. The method further comprises the steps of (c) maneuvering the fulcrum members until each fulcrum member engages an undersurface of the table top; (d) rotating the dolly about a focal point of rotation until the fulcrum members pick up the table and the support member supports the base of the table; and (e) moving the pedestal table along a flat surface or floor by means of the at least one wheel rotatingly connected to the frame.

In an ninth preferred embodiment of the present invention, the seventh preferred embodiment is modified to include rotation of the dolly about a wheel axle that serves as the focal point of rotation.

Further objects, features and advantages of the present invention will become apparent from the Detailed Description of Preferred Embodiments, which follows, when considered together with the attached drawings.

DETAILED DESCRIPTION OF THE PREFERRED EMBODIMENTS OF THE INVENTION

In accordance with the present invention, an apparatus and a method for moving a pedestal table is described, wherein the apparatus embodiment is detailed first in order to facilitate an easier understanding of the invention.

Figure 3:
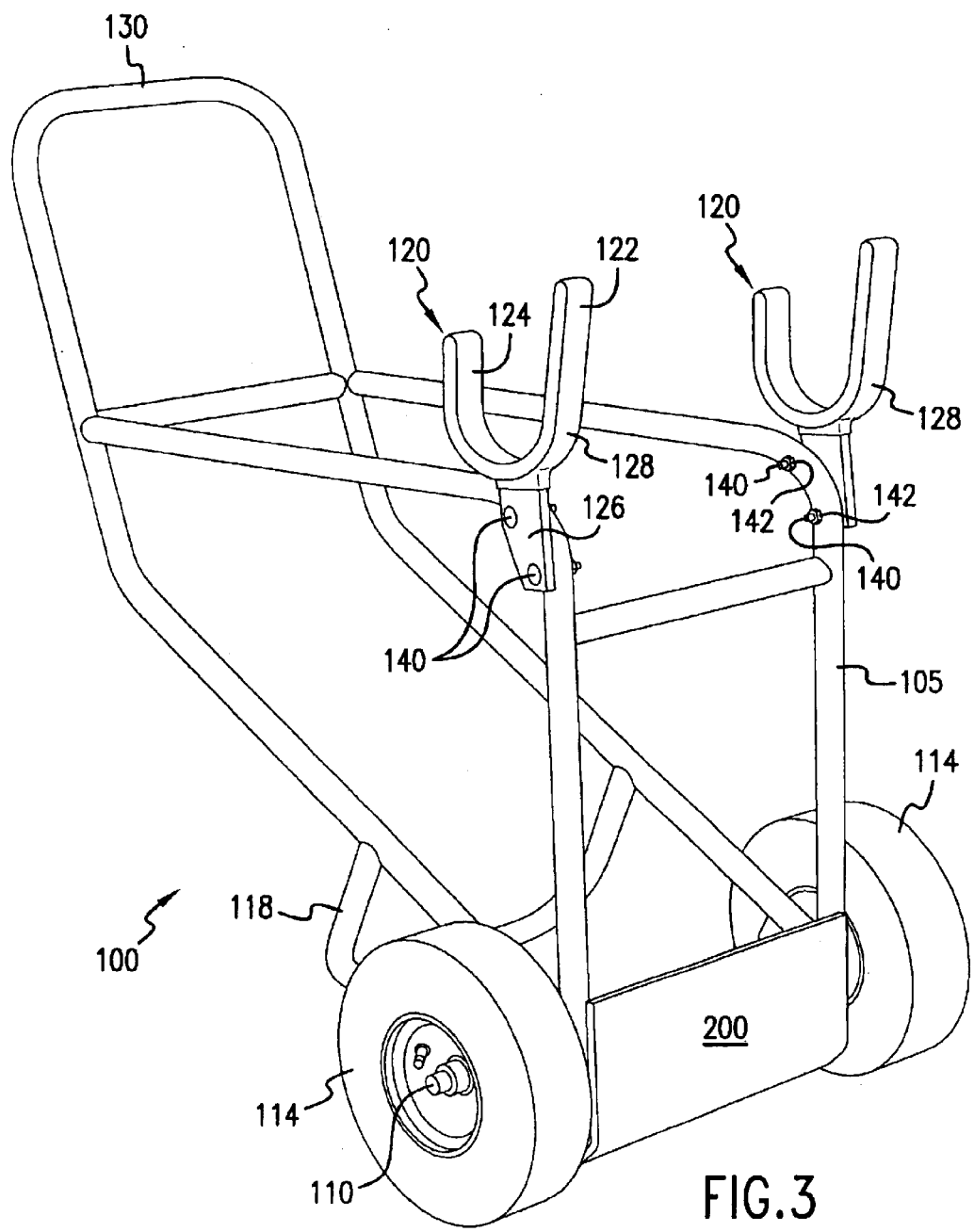
FIG. 3 is a perspective view of the table dolly for carrying a pedestal table in accordance with a preferred embodiment of the present invention.

The apparatus of the present invention is a table dolly for carrying a pedestal table. In the drawings, like character references are used to identify like parts. As shown in FIG. 3, the pedestal table dolly 100 in accordance with a preferred embodiment of the instant invention is constructed to have a frame 105 preferably made of a lightweight metal, such as aluminum alloy tubing, to which a wheel axle 110 connects so that wheels 114 can be mounted to the frame to permit wheeled motion of the dolly. As would be understood by one skilled in the art, the frame 105 is not limited to being made of any single particular material and could be made of metals other than aluminum, or even of nonmetallic materials such as wood or plastic or composites thereof.

Figure 2:
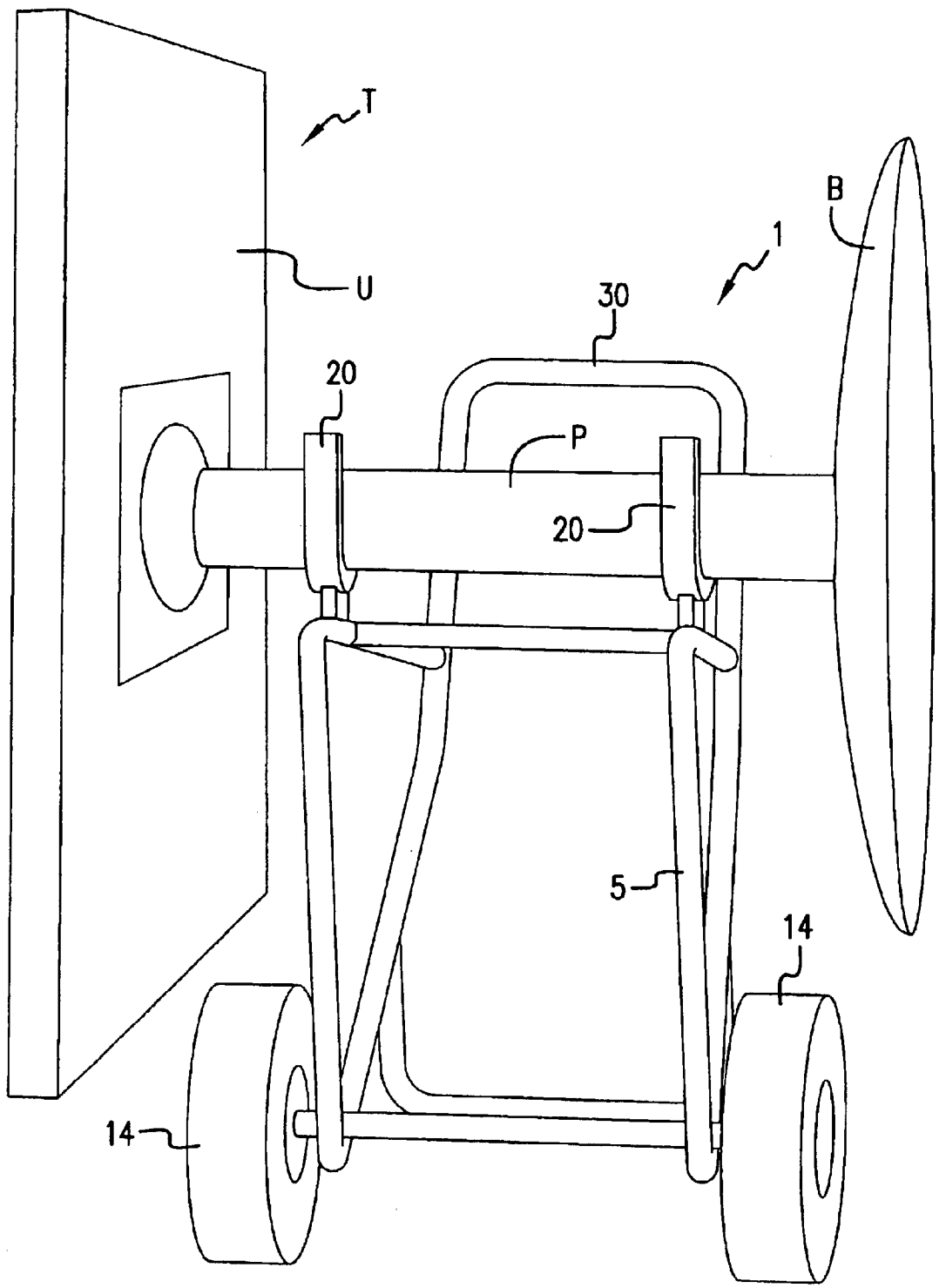
FIG. 2 is a front perspective view of the prior art pedestal table dolly showing the only practical manner of carrying a pedestal table with the prior art device.
Figure 4:
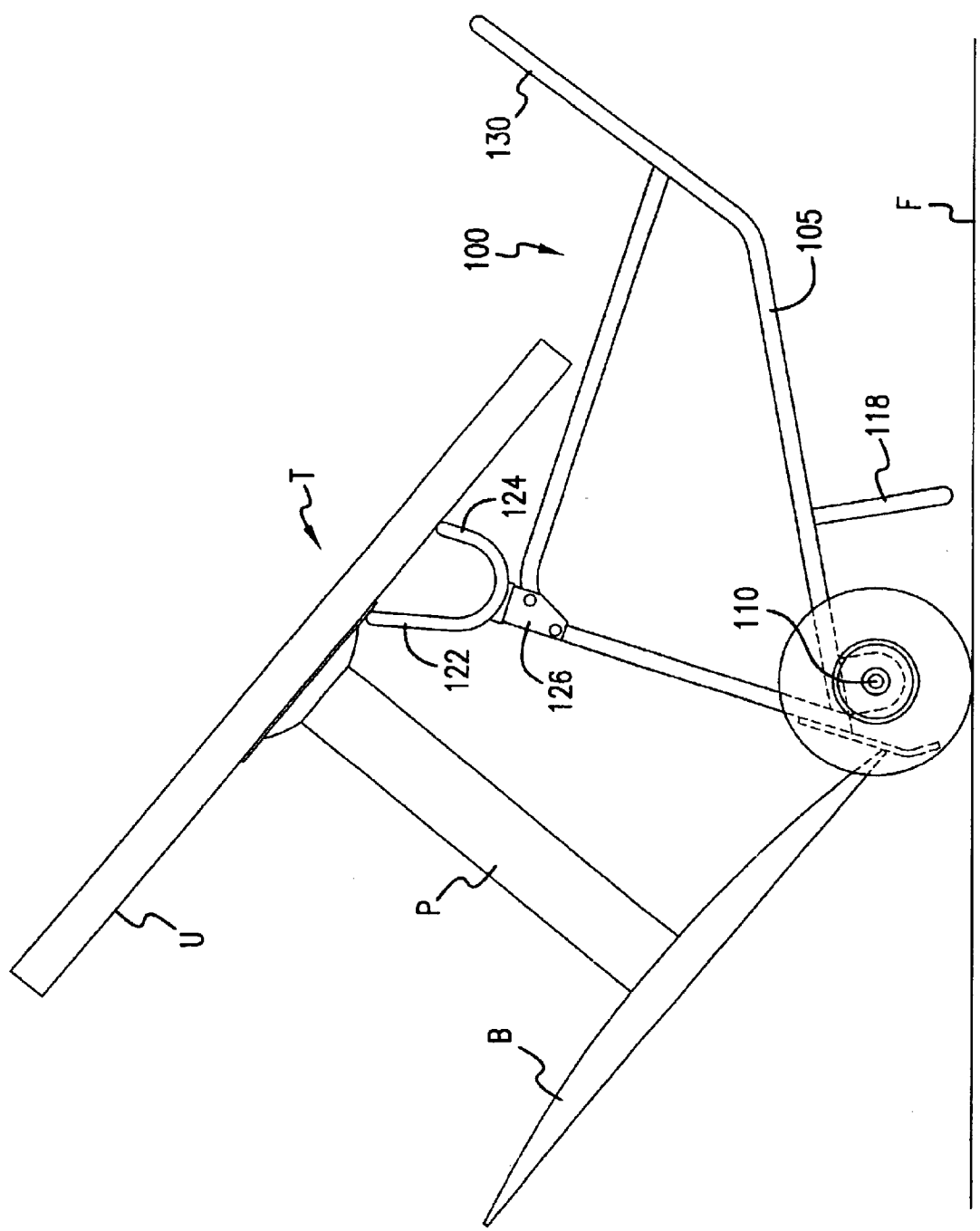
FIG. 4 is a side view of the table dolly in accordance with the preferred embodiment of the present invention shown in FIG. 4, wherein the dolly is carrying a pedestal table.

Frame 105 includes a stand portion 118 so that the two wheels 114 and the stand portion form a tripod for supporting the table dolly 100 on a flat surface or floor. Stand portion 118 can also be used as a lever for rotating the frame 105 about the wheel axle axis 110 as will be described below. Two brackets 120, being cradle hooks or claws, are disposed and positioned on the frame 105 so as to provide a cradle for holding a pedestal table T in a similar manner as does the prior art table dolly 1 as shown in FIG. 2. However, the instant table dolly 100 has structure that allows the dolly to carry a pedestal table T as shown in FIG. 4.

Each bracket 120 preferably has a roughly J-shaped portion (122 and 124) that includes a long forwardly pointing finger 122 contiguous with a short rearwardly pointing finger 124, and a base portion 126 located at the base of the roughly J-shaped portion. The base portion 126 has a plurality of holes (not shown) that receive bolts 140 that engage nuts 142 for attaching the base portion to the frame 105. Frame 105 also has holes (not shown) that correspond to the holes in the base portions 126 so that each bracket 120 is detachably connected to the frame 105 in a conventional manner using bolts 140 or other suitable connector. One skilled in the art would appreciate that each bracket 120 could be integrally attached to frame 105 by welding or by some other non-detachable bond.

As would be appreciated by one skilled in the art, the shape of brackets 120 is not limited to a roughly J-shaped bracket. Other shapes that permit the formation of a cradle for carrying the pillar P of a table T can be used such as a U-shape, a V-shape, a C-shape, a check-shape, or approximations of these shapes.

The "check-shape" is defined as a V-shape wherein one of the two fingers of the "V" is shorter than the other finger. Another characteristic of these shapes or approximations thereof is that each shape provides two fingers wherein one of the fingers functions as a fulcrum member. For example, the J-shaped brackets illustrated in FIGS. 3 and 4 include finger 122 and finger 124 wherein finger 122 serves as a fulcrum member upon which the undersurface U of table T can be engaged as best seen in FIG. 5.

A resilient or scratch preventing material or pad 128 completely covers the entire outer surface of both fingers 122 and 124 and covers a portion of the outer surface of the base portion 126. Thus, material or pad 128 provides a contiguous cushioned, scratch preventing surface or pad on a significant portion of the outer surface of each bracket 120, thereby significantly avoiding or lessening the likelihood of one of the brackets scratching or gouging table T. Preferably, material or pad 128 is provided by dipping each bracket 120 into a suitable padding material such as rubber material, synthetic rubber material, plastic or the like. Preferably, material or pad 128 is made from a soft, resilient and durable coating material such as plastisol. The padding material also adds to the ability of the fulcrum member to grip the undersurface U without slipping to hold the undersurface of the pedestal table in place using frictional forces.

Figure 5:
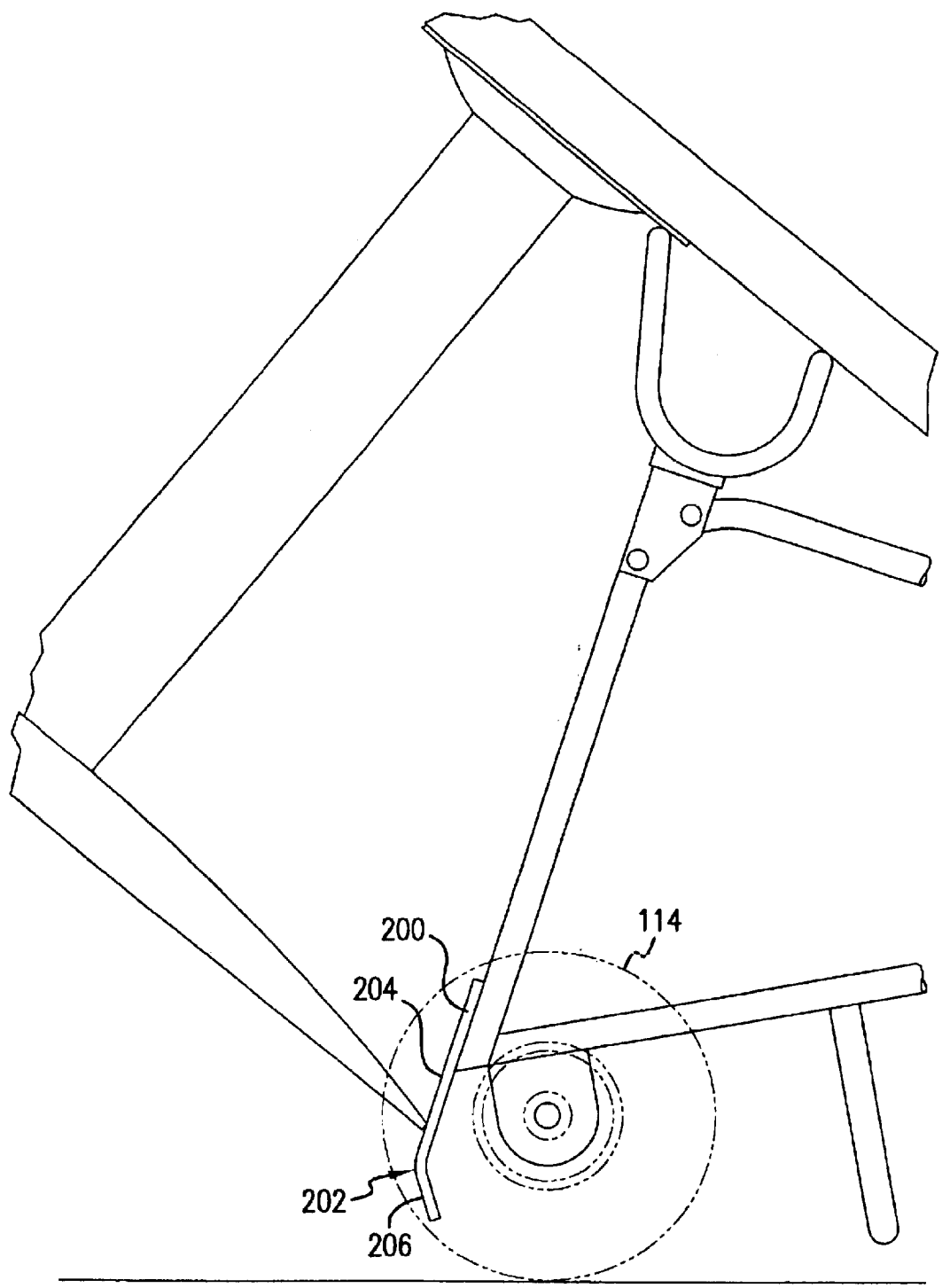
FIG. 5 is a side view of the table dolly in accordance with the preferred embodiment shown in FIG. 4 with the wheel shown in shadow outline with the dolly carrying a pedestal table.
Figure 6A:
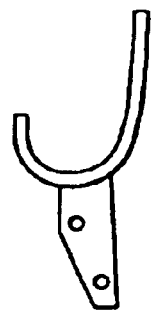
FIG. 6 shows permissible shapes for the brackets such as (a) a J-shaped bracket, (b) a U-shaped bracket, (c) a V-shaped bracket, (d) a C-shaped bracket, and (e) a check-shaped bracket.
Figure 6B:
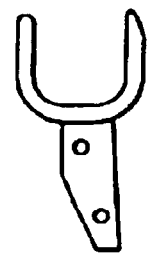
Figure 6C:
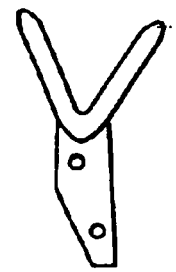
Figure 6D:
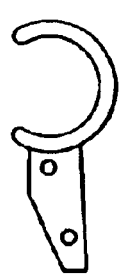
Figure 6E:
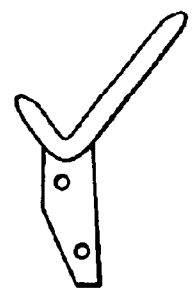

Dolly 100 additionally has a support member 200 disposed on the front end of frame 105 so that the support member engages the base B of table T when the dolly carries the table T as shown in FIGS. 4 and 5. In one particular embodiment of the invention, support member 200 is a plate having a bend 202 so that the support member does not extend beyond the radius of wheels 114. Furthermore, first outer surface portion 204 is used to engage the base portion of shorter tables, whereas second outer surface portion 206 is used to engage the base portion of taller tables. As shown in FIGS. 4 and 5, bend 202 provides a demarcation point between first outer surface portion 204 and second outer surface portion 206.

To maneuver the table dolly 100, frame 105 has a handle portion 130, which is grabbed by one using the dolly so the dolly can be pushed or pulled on a flat surface or floor F. FIGS. 4 and 5 show the dolly 100 holding a pedestal table T by fulcrum members 122 of brackets 120. Table T is stabilized by the engagement of the base B with the support member 200, which helps balance the table on the dolly 100. The essential feature here is that although the undersurface U may engage the fulcrum members 122 and the fingers 124, it is only necessary that the undersurface contacts the fulcrum members when the base B rests against the support member 200 because this relationship between the dolly 100 and the table provides a stable three point rest (i.e. two fulcrum members and the support member) upon which the table is carried by the dolly. As is plain from FIG. 4, one using the dolly 100 can push or pull on handle portion 130 to move the dolly, and the pedestal table T carried by the dolly as the dolly moves along a flat surface or floor F by means of the wheels 114.

Figure 1:
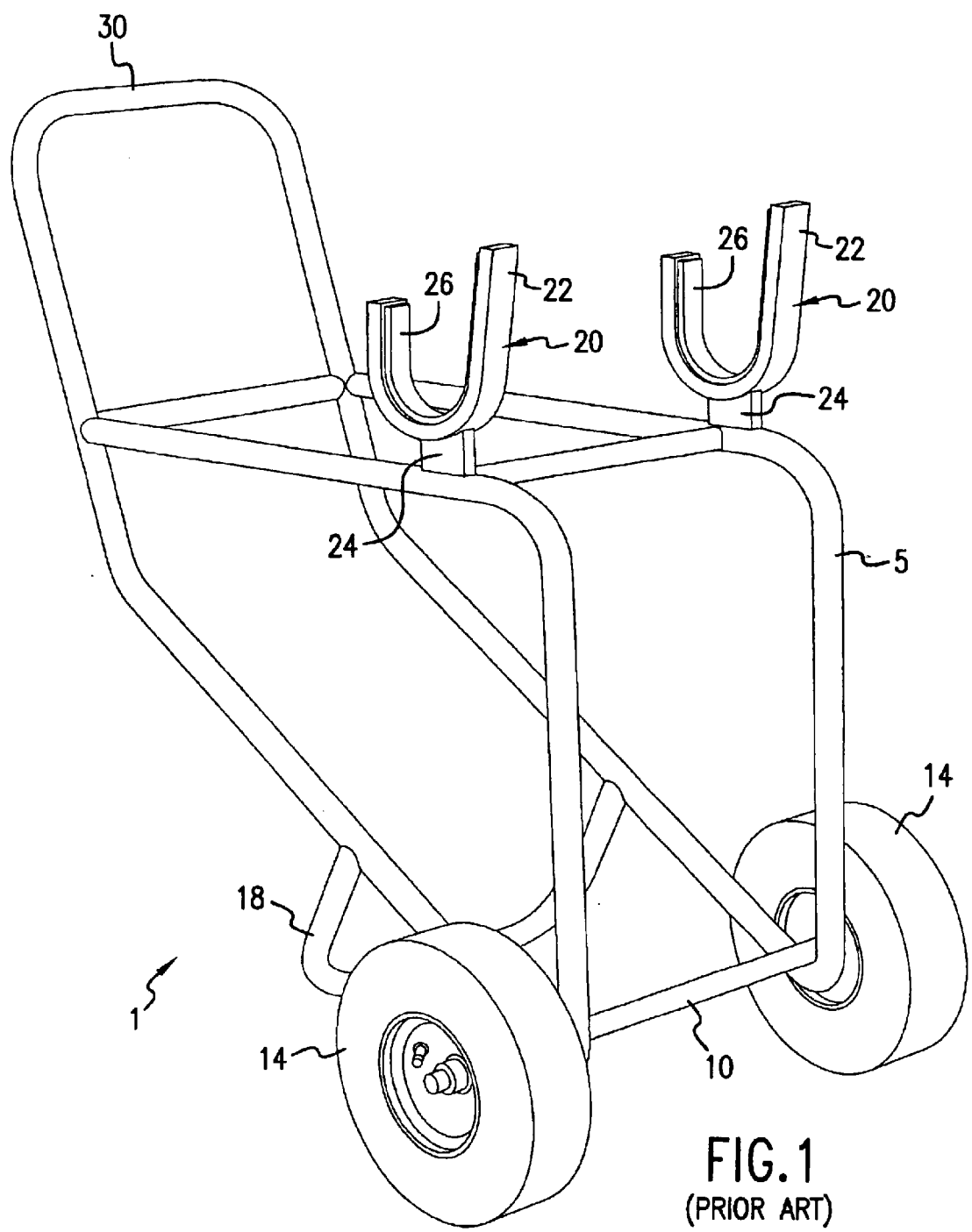
FIG. 1 is a perspective view of the prior art pedestal table dolly.

The main advantage of being able to carry table T on dolly 100 as shown in FIGS. 4 and 5 is that it is no longer necessary to tilt table T on its side to pick up the table with the dolly, as shown, for example in FIGS. 1 and 2. With dolly 100, one only has to tilt the dolly forward to maneuver the brackets 120 underneath the table T, then tilt the dolly rearward until the fulcrum members 122 engage the undersurface U of the table. Wheel axle 110 serves as the focal point or axis of rotation. By continuing to tilt the dolly 100 rearward into the position shown in FIG. 4, the support member 200 will move to engage the base B of the table T as the fulcrum members 122 pick up the table. If necessary, the user may step on stand portion 118 to generate additional leverage to rearwardly tilt dolly 100 and table T into the traveling position shown in FIG. 4. Once the dolly 100 and table T are in the position shown in FIG. 4, the dolly carrying the table can be easily moved about a room or flat surface. In this manner, a pedestal table T can be conveniently and rapidly moved about a room or catering area by a single person using the dolly 100.

Of course, one skilled in the art would realize that dolly 100 can also be used to carry pedestal table T in the same manner as the prior art table dolly 1 does as shown in FIG. 2. In other words, brackets 120 provide a cradle in which the pillar P of table T may rest so that the dolly 100 carries the table in the cradle.

The method of moving a pedestal table is yet another preferred embodiment of the present invention. The first preferred embodiment of the method in accordance with the invention comprising the steps of: (a) providing a pedestal table having a table top, a pillar having one end connected connected to the table top and having a base at another end; and (b) providing a dolly apparatus. The apparatus comprises (i) a frame having a handle portion, (ii) at least one wheel member rotatingly connected to the frame, (iii) two brackets disposed on the frame, wherein each bracket provides a fulcrum member for engaging an undersurface of a pedestal table, and (iv) a support member disposed on a front end of the frame, so that when each fulcrum member engages an undersurface of a pedestal table, the base of the pedestal table is supported by the support member so that the dolly apparatus carries the pedestal table. The method further comprises the steps of (c) maneuvering the fulcrum members until each fulcrum member engages an undersurface of the table top; (d) rotating the dolly about a focal point of rotation until the fulcrum members pick up the table and the support member supports the base of the table; and (e) moving the pedestal table along a flat surface or floor by means of the at least one wheel rotatingly connected to the frame.

While the present invention has been described with reference to certain preferred embodiments, one of ordinary skill in the art will recognize that additions, deletions, substitutions, modifications, and improvements can be made while remaining within the spirit and scope of the present invention as defined by the present claims.

What is claimed is:

1. A table dolly apparatus for carrying a pedestal table wherein the table includes a table top having an undersurface, a central pillar connected to the table top at one end and having a base at another, the dolly apparatus comprising:
   (a) a frame having a handle portion;
   (b) a pair of wheel members rotatingly connected to an axle connected to the frame, each wheel member having a radius;
   (c) two brackets disposed on the frame, wherein each bracket provides a fulcrum member for engaging an undersurface of a pedestal table; and
   (d) a support member disposed on a front end of the frame, so that when each fulcrum member engages an undersurface of a pedestal table, the base of the pedestal table is supported by the support member so that the dolly apparatus carries the pedestal table,
   wherein the support member comprises a plate disposed in front of the axle and between the two wheel members.

2. A table dolly apparatus as recited in claim 1, wherein the two brackets are detachably attached to the frame.

3. A table dolly apparatus as recited in claim 1, wherein each bracket is roughly J-shaped.

4. A table dolly apparatus as recited in claim 1, wherein each bracket is formed to have a shape selected from the group consisting of a U-shape, a V-shape, a C-shape, a check-shape, or an approximation of one of these shapes.

5. A table dolly apparatus as recited in claim 1, wherein each fulcrum member has an outer surface covered by a resilient material.

6. A table dolly apparatus as recited in claim 1, wherein the frame includes a stand portion.

7. A table dolly apparatus as recited in claim 1, wherein the support member has a first outer surface portion demarcated from a second outer surface portion by a bend in the support member.

8. A table dolly apparatus as recited in claim 3, wherein the support member has a first outer surface portion demarcated from a second outer surface portion by a bend in the support member.

9. A table dolly apparatus as recited in claim 1, wherein the two brackets are detachably attached to the frame and each fulcrum member has an outer surface covered by a resilient material.

10. A table dolly apparatus as recited in claim 9, wherein the support member has a first outer surface portion demarcated from a second outer surface portion by a bend in the support member.

11. A table dolly apparatus as recited in claim 10, wherein each bracket includes two fingers contiguous with a base portion, wherein one of the two fingers functions as the fulcrum member.

12. A table dolly apparatus as recited in claim 11, wherein the resilient material covers the entire outer surface of the two fingers and a portion of an outer surface of the base portion of each bracket.

13. A table dolly apparatus as recited in claim 12, wherein the first outer portion of the support member is attached to the frame and the second outer portion of the support member bends towards the axle.

14. A method for moving pedestal tables comprising the steps of:
   (a) providing a pedestal table having a table top, a pillar having one end connected to the table top and having a base at another end;
   (b) providing a dolly apparatus comprising
       i. a frame having a handle portion,
       ii. a pair of wheel members rotatingly connected to an axle connected to the frame, each wheel member having a radius,
       iii. two brackets disposed on the frame, wherein each bracket provides a fulcrum member for engaging an undersurface of a pedestal table, and
       iv. a support member disposed on a front end of the frame, so that when each fulcrum member engages an undersurface of a pedestal table, the base of the pedestal table is supported by the support member so that the dolly apparatus carries the pedestal table wherein the support member comprises a plate disposed in front of the axle and between the two wheel members;
   (c) maneuvering the fulcrum members until each fulcrum member engages an undersurface of the table top;
   (d) rotating the dolly about a focal point of rotation until the fulcrum members pick up the table and the support member supports the base of the table; and
   (e) moving the pedestal table along a flat surface or floor by means of the at least one wheel rotatingly connected to the frame.

15. A method for moving pedestal tables as recited in claim 14, wherein rotation of the dolly occurs about the wheel axle that serves as the focal point of rotation.

16. A method for moving pedestal tables as recited in claim 14, wherein said support member is contained within, and does not extend beyond, the radius of each wheel member, and said support member engages and helps balance the table on the dolly when said support member supports the base of the table.

17. A table dolly apparatus for carrying a pedestal table wherein the table includes a table top having an undersurface, a central pillar connected to the table top at one end and having a base at another, the dolly apparatus comprising:
   (a) a frame having a handle portion;
   (b) pair of wheel members rotatingly connected to an axle connected to the frame, each wheel member having a radius;
   (c) two brackets disposed on the frame, wherein each bracket provides a fulcrum member for engaging an undersurface of a pedestal table; and
   (d) a support member disposed on a front end of the frame, so that when each fulcrum member engages an undersurface of a pedestal table, the base of the pedestal table is supported by the support member so that the dolly apparatus carries the pedestal table,
   wherein the support member comprises a plate disposed in front of the axle and between the two wheel members so the support member does not extend beyond the radius of each wheel member.

18. A table dolly apparatus for carrying a pedestal table wherein the table includes a table top having an undersurface, a central pillar connected to the table top at one end and having a base at another, the dolly apparatus comprising:
   (a) a frame having a handle portion;
   (b) a pair of wheel members rotatingly connected to an axle connected to the frame, each wheel member having a radius;

(c) two brackets disposed on the frame, wherein each bracket provides a fulcrum member for engaging an undersurface of a pedestal table, wherein the two brackets are detachably attached to the frame and each fulcrum member has an outer surface covered by a resilient material, wherein each bracket includes two fingers contiguous with a base portion, and wherein one of the two fingers functions as the fulcrum member; and (d) a support member disposed on a front end of the frame, so that when each fulcrum member engages an undersurface of a pedestal table, the base of the pedestal table is supported by the support member so that the dolly apparatus carries the pedestal table, wherein the support member comprises a plate disposed in front of the axle and between the two wheel members so the support member is contained within a cylindrical volume extending from one wheel member to the other wheel member and having a radius equivalent to the radius of each wheel member.

* * * * *